US008829720B2

(12) United States Patent
Ichikawa et al.

(10) Patent No.: US 8,829,720 B2
(45) Date of Patent: Sep. 9, 2014

(54) APPARATUS FOR SELECTING SPECIFICATIONS OF POWER STORAGE SYSTEM AND METHOD FOR SELECTING SPECIFICATIONS OF POWER STORAGE SYSTEM

(75) Inventors: Shinji Ichikawa, Toyota (JP); Daisuke Ishii, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/497,167

(22) PCT Filed: Oct. 5, 2009

(86) PCT No.: PCT/JP2009/067335
§ 371 (c)(1),
(2), (4) Date: Mar. 20, 2012

(87) PCT Pub. No.: WO2011/042943
PCT Pub. Date: Apr. 14, 2011

(65) Prior Publication Data
US 2012/0181870 A1   Jul. 19, 2012

(51) Int. Cl.
H02J 1/00 (2006.01)
H02J 3/32 (2006.01)
H02J 3/00 (2006.01)

(52) U.S. Cl.
CPC ............ *H02J 3/32* (2013.01); *H02J 2003/003* (2013.01); *Y04S 10/54* (2013.01)
USPC ................. 307/80; 307/19; 307/72; 307/126; 700/286; 705/26

(58) Field of Classification Search
USPC ............ 307/19, 72, 80, 126; 700/286; 705/26
See application file for complete search history.

(56) References Cited

U.S. PATENT DOCUMENTS 6,900,556 B2 * 5/2005 Provanzana et al. ............ 307/19
7,873,441 B2 * 1/2011 Synesiou et al. .............. 700/286
(Continued)

FOREIGN PATENT DOCUMENTS

EP    1 156 573 A2    11/2001
EP    1 414 126 A1    4/2004
(Continued)

OTHER PUBLICATIONS

International Search Report issued in Application No. PCT/JP2009/067335; Dated Dec. 28, 2009 (With Translation).
(Continued)

*Primary Examiner* — Jared Fureman
*Assistant Examiner* — Alfonso Perez Borroto
(74) *Attorney, Agent, or Firm* — Oliff PLC

(57) ABSTRACT

A power storage system includes a power control unit including an inverter, and a battery for storing electrical energy supplied with commercial AC power by way of the inverter to supply the electrical energy to an electrical load. An apparatus for selecting specifications of a power storage system includes a data input interface unit for input of data obtained by measuring power usage during prescribed hours at a location of power consumption where the power storage system is to be installed, and an operation processing unit for finding annual average power usage during prescribed hours based on the measured data, and determining an output of the inverter based on the average power usage.

5 Claims, 8 Drawing Sheets

(56) References Cited

U.S. PATENT DOCUMENTS

| | | | | |
|---|---|---|---|---|
| 7,917,251 | B2* | 3/2011 | Kressner et al. | 700/286 |
| 2002/0123850 | A1 | 9/2002 | Miyoshi et al. | |
| 2002/0128747 | A1 | 9/2002 | Mima | |
| 2009/0157529 | A1* | 6/2009 | Ehlers et al. | 705/26 |
| 2009/0192655 | A1 | 7/2009 | Ichikawa et al. | |
| 2009/0195349 | A1* | 8/2009 | Frader-Thompson et al. | 340/3.1 |
| 2010/0141046 | A1* | 6/2010 | Paik | 307/126 |
| 2010/0293045 | A1* | 11/2010 | Burns et al. | 705/14.11 |

FOREIGN PATENT DOCUMENTS

| | | |
|---|---|---|
| EP | 1 156 573 A3 | 11/2004 |
| JP | A-5-292672 | 11/1993 |
| JP | A-5-292674 | 11/1993 |
| JP | A-7-312597 | 11/1995 |
| JP | A-8-141918 | 6/1996 |
| JP | A-8-331776 | 12/1996 |
| JP | A-09-223515 | 8/1997 |
| JP | A-11-41831 | 2/1999 |
| JP | A-11-46458 | 2/1999 |
| JP | A-11-136866 | 5/1999 |
| JP | A-11-178237 | 7/1999 |
| JP | A-2000-032669 | 1/2000 |
| JP | A-2001-8380 | 1/2001 |
| JP | A-2001-8385 | 1/2001 |
| JP | A-2002-171669 | 6/2002 |
| JP | A-2002-247761 | 8/2002 |
| JP | A-2002-262456 | 9/2002 |
| JP | A-2005-332040 | 12/2005 |
| JP | A-2006-109621 | 4/2006 |
| JP | A-2007-312597 | 11/2007 |
| JP | A-2008-54439 | 3/2008 |
| JP | A-2008-141918 | 6/2008 |
| WO | WO 2007/102757 A1 | 9/2007 |

OTHER PUBLICATIONS

Mar. 9, 2010 International Search Report issued in International Patent Application No. PCT/JP2009/071737 (With Translation).

U.S. Appl. No. 13/514,129 in the name of Ichikawa filed on Jun. 6, 2012.

* cited by examiner

FIG.12
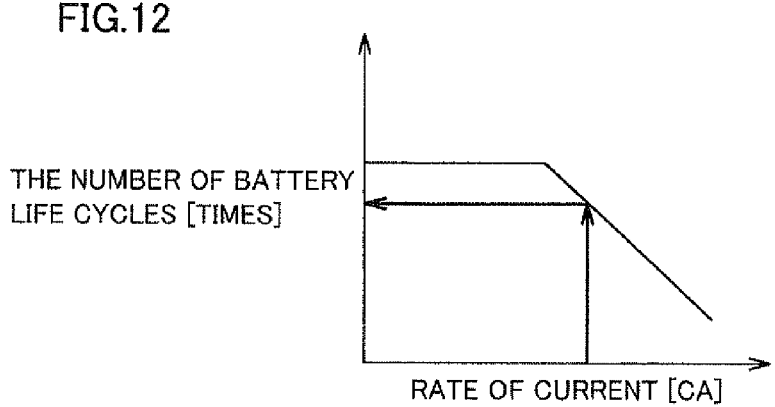
FIG.13
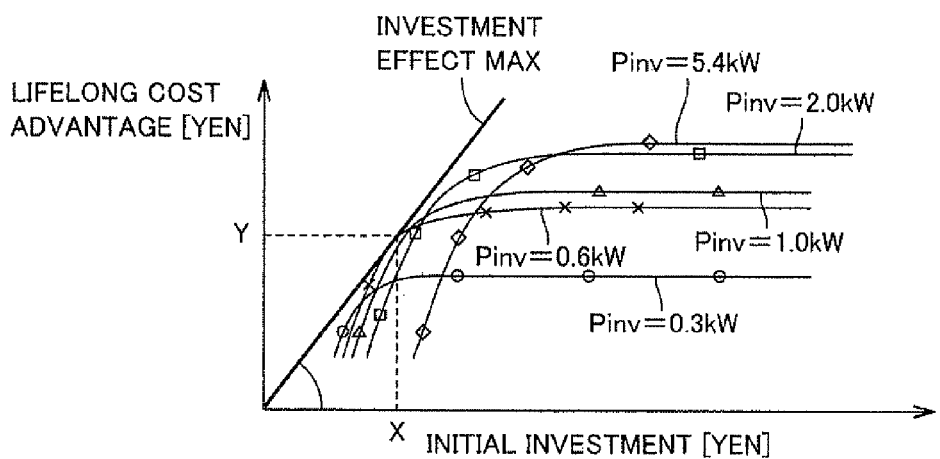
FIG.14
| HOUSEHOLD | H1 | H2 | H3 | H4 | H5 | AVERAGE OF 5 HOUSEHOLDS |
|---|---|---|---|---|---|---|
| AVERAGE POWER USAGE (kW) | 1.056 | 0.490 | 0.459 | 0.560 | 0.765 | 0.666 |
| INVERTER OUTPUT MAXIMIZING INVESTMENT EFFECT (kW) | 1.0 | 0.5 | 0.5 | 0.5 | 0.6 | — |

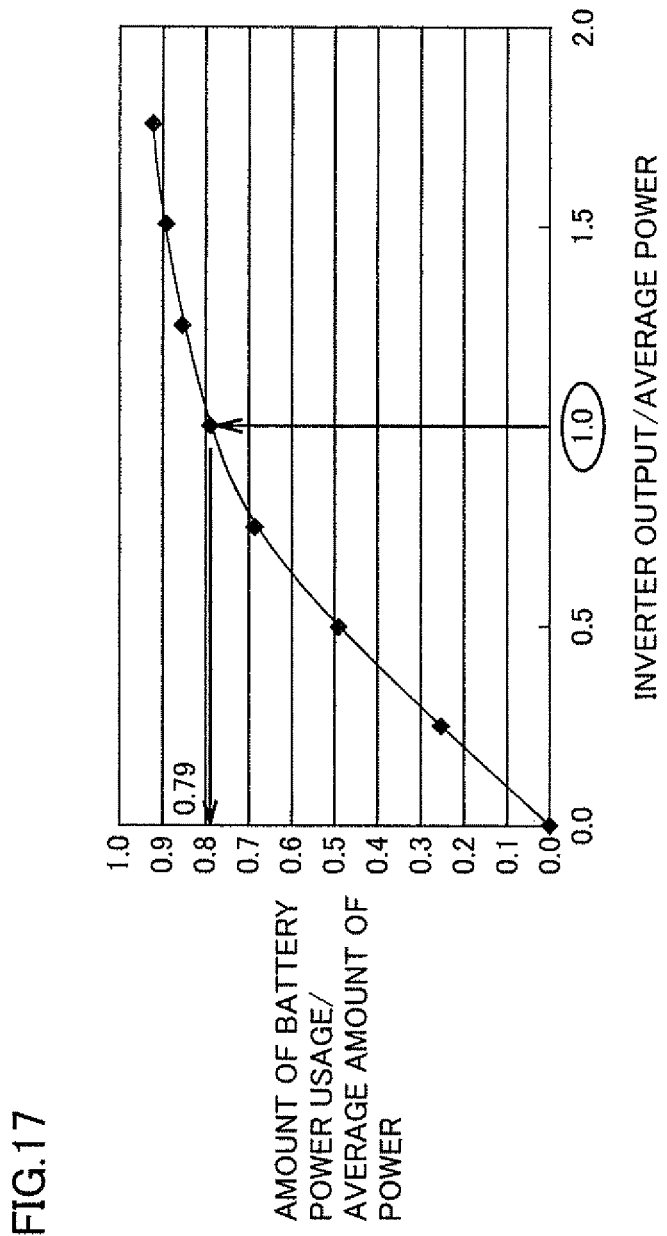

APPARATUS FOR SELECTING SPECIFICATIONS OF POWER STORAGE SYSTEM AND METHOD FOR SELECTING SPECIFICATIONS OF POWER STORAGE SYSTEM

TECHNICAL FIELD

This invention relates to an apparatus for selecting specifications of a power storage system and a method for selecting specifications of a power storage system.

BACKGROUND ART

While demand for power is less at midnight than in the daytime, a power generator can be used more efficiently when it is continuously operated. Since generated power is difficult to store, the power generation capability of power generating facilities is set in accordance with peaks of power demand. Under such circumstances, it is well known that power costs less at midnight than in the daytime. At places of power consumption, such as homes, companies, factories, and the like, it is desirable that midnight power that has been stored in storage type batteries be used in the daytime to thereby level out reduction in power charges and a load.

Japanese Patent Laying-Open No. 2000-32669 (PTL1) discloses a technique wherein a storage battery is introduced to a home to store midnight power with a charger, and this power is drawn from the storage battery in the daytime for use as a household power supply.

CITATION LIST

Patent Literature

PTL 1: Japanese Patent Laying-Open No. 2000-32669

SUMMARY OF INVENTION

Technical Problem

With the recent widespread use of electric vehicles, hybrid vehicles, grid-connected photovoltaic power generation systems, and the like, costs for power storage devices are now decreasing, and the leveling of power by introduction of a power storage device is entering a practical stage for consumers with small capacity, such as a household.

Since such a power storage device is adapted to DC power, it requires an inverter so as to be connected with an AC load used with a commercial power supply or the like. How power is used at home, however, varies depending on the family structure, the facilities used, and the like. Therefore, it is desirable that the capacity of the power storage device or the output of the inverter be changed for each family.

An object of the present invention is to provide an apparatus for selecting specifications of a power storage system and a method for selecting specifications of a power storage system, capable of offering a power storage system optimal for patterns of use that differ for each user.

Solution to Problem

In summary, this invention is directed to an apparatus for selecting specifications of a power storage system, and the power storage system includes an inverter configured to receive commercial AC power and convert the AC power to DC power, and a power storage device for storing electrical energy supplied with the commercial AC power by way of the inverter to supply the electrical energy to an electrical load. The apparatus for selecting specifications of a power storage system includes an interface for input of data obtained by measuring power usage during prescribed hours at a location of power consumption where the power storage system is to be installed, and an operation processing unit for finding annual average power usage during the prescribed hours based on the measured data, and determining an output of the inverter based on the average power usage.

Preferably, the operation processing unit adopts the average power usage as the output of the inverter.

More preferably, the apparatus for selecting specifications of a power storage system further includes a storage unit for holding predetermined compensation factors corresponding to a plurality of inverter outputs, respectively. The operation processing unit acquires from the storage unit a compensation factor corresponding to a selected output of the inverter, and calculates an actual amount of use out of the power usage available from the power storage device by multiplying, by the acquired compensation factor, an amount of power used in one day during the prescribed hours obtained based on a result of measuring the power usage, and determines a capacity of the power storage device based on the actual amount of use.

Even more preferably, the apparatus for selecting specifications of a power storage system further includes a display unit for displaying the determined output of the inverter and the determined capacity of the power storage device.

According to another aspect, this invention is directed to a method for selecting specifications of a power storage system, and the power storage system includes an inverter configured to receive commercial AC power and convert the AC power to DC power, and a power storage device for storing electrical energy supplied with the commercial AC power by way of the inverter to supply the electrical energy to an electrical load. The method for selecting specifications of a power storage system includes the steps of measuring power usage during prescribed hours at a location of power consumption where the power storage system is to be installed, finding annual average power usage during the prescribed hours based on a measurement result, and determining an output of the inverter based on the average power usage.

Preferably, in the step of determining an output of the inverter, the average power usage is adopted as the output of the inverter.

Preferably, the method for selecting specifications of a power storage system further includes the steps of acquiring a compensation factor corresponding to a selected output of the inverter from a predetermined map, and calculating an actual amount of use out of the power usage available from the power storage device by multiplying, by the acquired compensation factor, an amount of power used in one day during the prescribed hours obtained based on a result of measuring the power usage, and determining a capacity of the power storage device based on the actual amount of use.

Advantageous Effects of Invention

According to the present invention, a power storage system optimal for patterns of use that differ for each user can be proposed.

BRIEF DESCRIPTION OF DRAWINGS

FIG. 12 is a diagram showing a relation between the number of battery life cycles and a rate of current.

FIG. 13 is a diagram showing results obtained by trial calculation of relations between initial investment and lifelong cost advantage.

FIG. 14 is a diagram showing results obtained by finding an inverter output at which the investment effect is maximized for each monitored household.

FIG. 17 is a map created based on FIG. 16.

DESCRIPTION OF EMBODIMENTS

Figure 1:
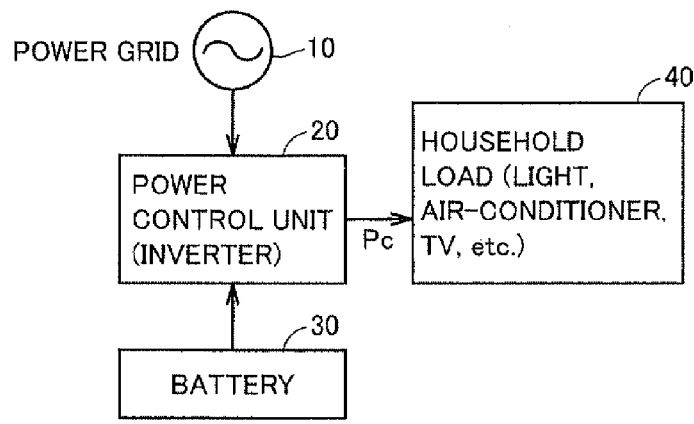
FIG. 1 is a diagram showing a configuration of a power storage system whose specifications are determined by using an apparatus for selecting specifications of a power storage system according to the present embodiment.

Embodiments of the present invention will be described in detail below, referring to the drawings. In the drawings, identical or corresponding parts are denoted by identical reference characters, and description thereof will not be repeated.

[Flow of Selecting Specifications of Power Storage System]

FIG. 1 is a diagram showing a configuration of a power storage system whose specifications are determined by using an apparatus for selecting specifications of a power storage system according to the present embodiment.

Referring to FIG. 1, the power storage system includes a battery 30 for storing power, capable of being charged and discharging, and a power control unit 20 for converting DC power outputted from battery 30 to AC power. Power control unit 20 includes an inverter capable of conversion between DC and AC.

Power control unit 20 also allows battery 30 to be charged, by receiving AC power from a commercial power supply 10 and converting it to DC power.

Power control unit 20 allows battery 30 to be charged, by receiving power from commercial power supply 10 during hours at night when power charges are inexpensive. Then, during hours in the daytime when power charges are expensive, power control unit 20 receives power discharged from battery 30 and converts it to AC power for supply to a household load 40.

At night, power control unit 20 allows battery 30 to be charged and also allows supply of power from commercial power supply 10 to household load 40.

It is noted that power control unit 20 may also be used in combination with a photovoltaic power generation unit. Power control unit 20 may encompass, for example, a device referred to as a power conditioner.

Figure 2:
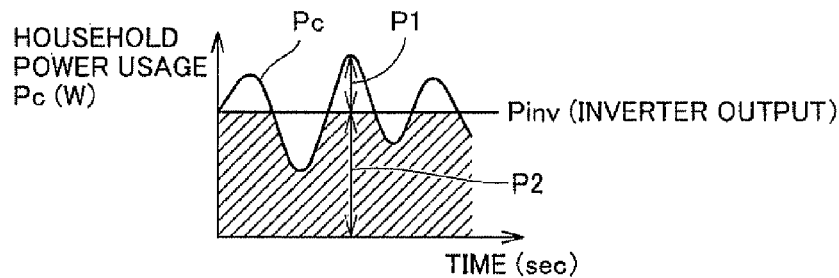
FIG. 2 is a diagram for explaining a relation between inverter output, battery, and household power usage.

FIG. 2 is a diagram for explaining a relation between inverter output, battery, and household power usage.

Referring to FIGS. 1 and 2, household power usage Pc varies with the time of day. Suppose, for example, that power is supplied from battery 30 to household load 40 for 8 hours from 9 to 17 o'clock in the daytime. However, power exceeding rated output power Pinv of the inverter of power control unit 20 cannot be discharged from battery 30. Therefore, when household power usage Pc exceeds rated output power Pinv of the inverter, a portion P2 of the power not exceeding Pinv is supplied from battery 30, and a portion P1 of the power exceeding Pinv is supplied with commercial power 10.

When household power usage Pc does not exceed rated output power Pinv of the inverter, all portions of household power usage Pc are supplied from battery 30.

That is, an amount of power shown in the hatched region in FIG. 2 is the energy supplied from the battery.

In such a power storage system, the amount of power cannot be easily decided because the power usage differs for each household. It is necessary to consider how the size of the inverter or battery should be determined to achieve significant cost-effectiveness. Here, how the rated output power of the inverter should be determined is an issue.

Figure 3:
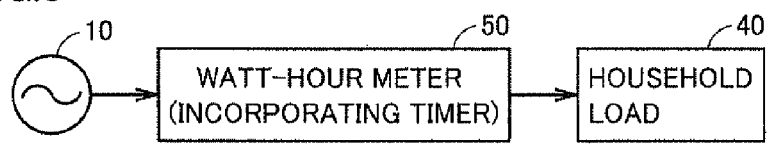
FIG. 3 is a diagram for explaining acquisition of data of household power usage Pc.

FIG. 3 is a diagram for explaining acquisition of data of household power usage Pc.

Referring to FIG. 3, in order to acquire data of household power usage Pc, a watt-hour meter 50 incorporating a timer is installed between commercial power supply 10 and household load 40 at a home prior to introduction of the power storage system. This watt-hour meter then records, for example, changes in power during hours (for example, for 8 hours from 9 to 17 o'clock) in which power is supplied from battery 30 to household load 40 by way of the inverter, for one to several days. Recorded results are, for example, accumulated in a storage medium such as a memory card, or transmitted via communication to an apparatus for selecting specifications.

Figure 4:
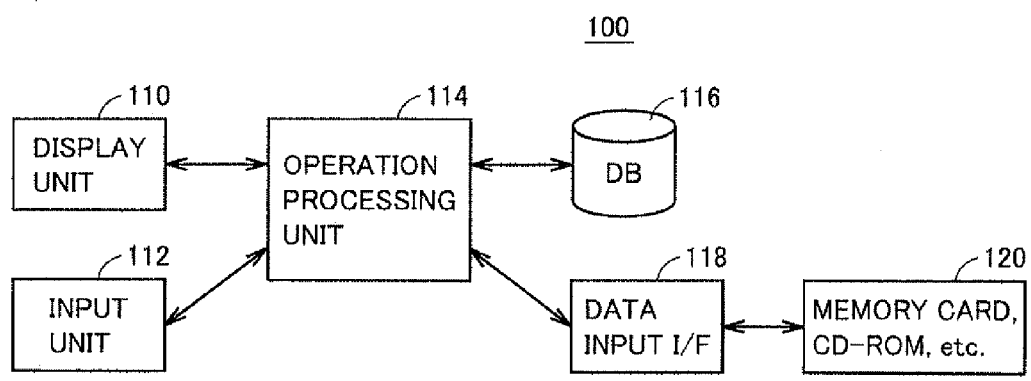
FIG. 4 is a block diagram showing a configuration of an apparatus for selecting specifications of a power storage system according to the present embodiment.

FIG. 4 is a block diagram showing a configuration of an apparatus for selecting specifications of a power storage system according to the present embodiment.

Referring to FIG. 4, an apparatus 100 for selecting specifications of a power storage system includes an operation processing unit 114, a display unit 110, an input unit 112, a database 116, and a data input interface unit 118. Apparatus 100 for selecting specifications may be implemented by a computer or the like.

Database 116 contains, for example, data such as a program executed by operation processing unit 114, a map for reference, and the like.

Data input interface unit 118, for example, communicates with watt-hour meter 50, or reads data from a computer-readable recording medium 120, such as a memory card, a CD-ROM, or the like.

Operation processing unit 114 receives an instruction or data from input unit 112, such as a keyboard, an operation terminal, or the like. Operation processing unit 114 also causes a result of operation processing to be displayed on display unit 110, as appropriate.

It is noted that apparatus 100 for selecting specifications is not limited to the configuration as described above, and may also be implemented by incorporating a plurality of CPUs. Moreover, apparatus 100 for selecting specifications may be implemented by either software or hardware. An example where apparatus 100 for selecting specifications is implemented by software will be described below.

Figure 5:
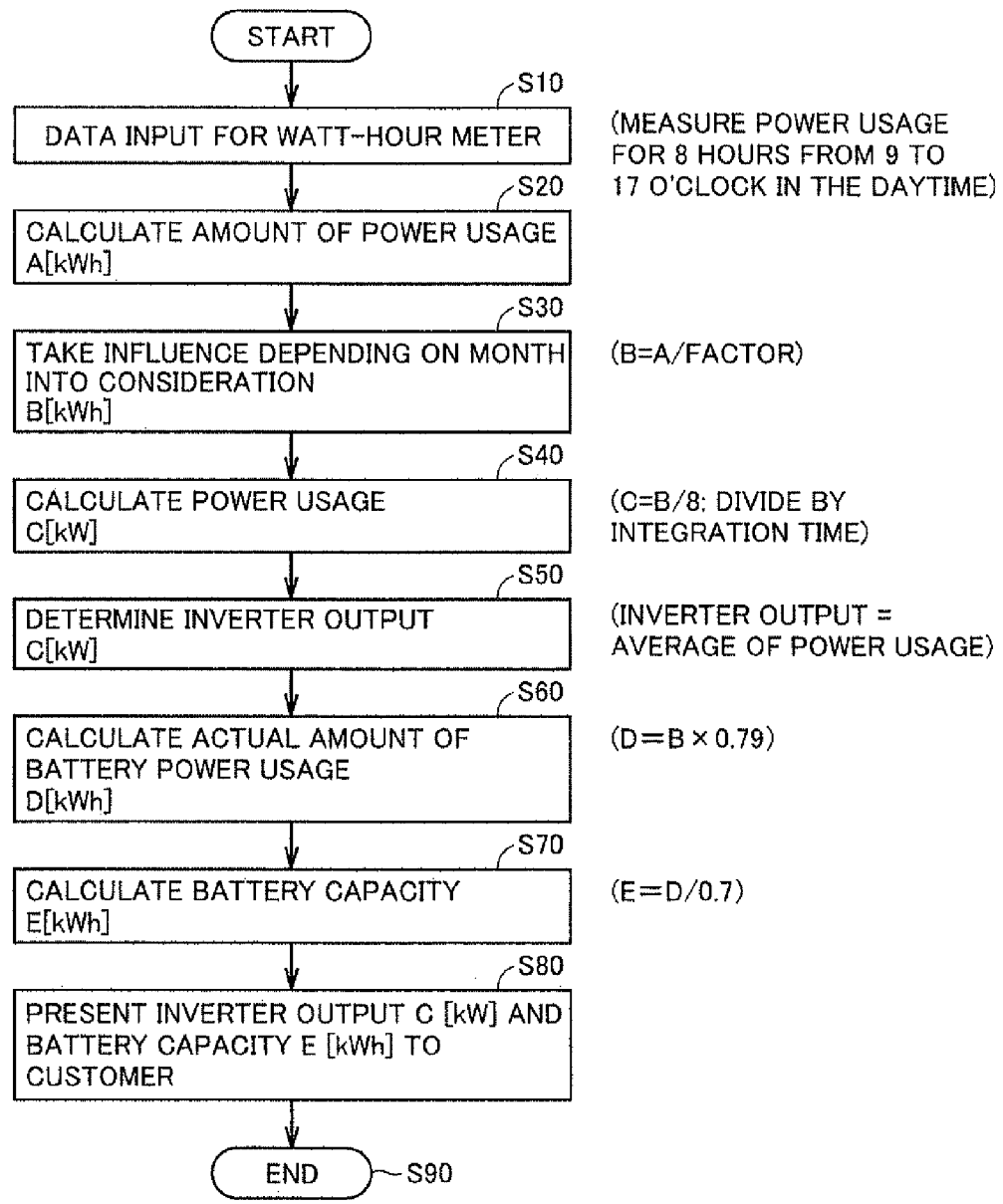
FIG. 5 is a flowchart for explaining processing executed by an operation processing unit 114 in FIG. 4.

FIG. 5 is a flowchart for explaining processing executed by operation processing unit 114 in FIG. 4.

Referring to FIG. 5, first at step S10, data input for the watt-hour meter is performed. The watt-hour meter measures with a timer power usage during hours in the daytime when power charges are expensive, for example, from 9 to 17 o'clock. While data may be data for one day, in order to improve accuracy, input of data for a plurality of days, from several days to about one week, is preferred.

Watt-hour meter 50 is temporarily installed in a customer's house prior to introduction of the power storage system to collect data.

Data may be inputted by, for example, making watt-hour meter 50 record transition in household power usage into a recording medium such as a memory card, and reading the data on the recording medium by way of data input interface unit 118. Alternatively, data of the household power usage may be inputted from watt-hour meter 50 via wireless communication or cable communication.

Then, at step S20, an amount of power usage is calculated. Here, an amount of power A [kWh] used in one day is calculated using the data of the hours from 9 to 17 o'clock (8 hours) when power charges are more expensive than at night.

Then, at step S30, influence depending on a month is taken into consideration. Power consumption tends to vary depending on a month in which data are acquired (for example, power consumption increases in summer). Thus, a variation factor is found by monitoring, in advance, amounts of power usage from 9 to 17 o'clock (8 hours) for a plurality of monitor households, for one year. The amount of power usage, calculated at step S20, is then multiplied by the variation factor, and an amount of power usage on average of the customer household is predicted.

Figure 6:
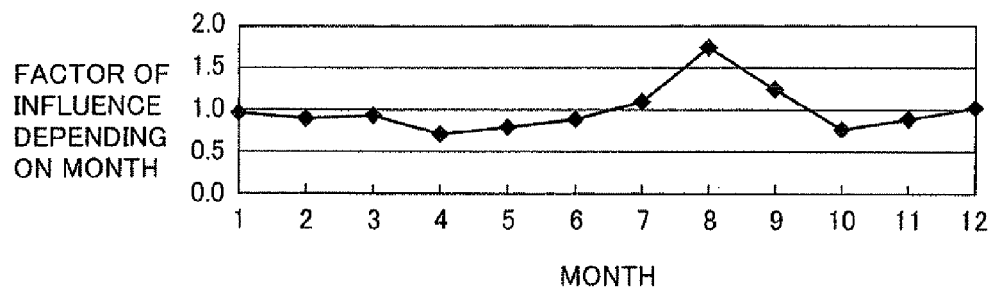
FIG. 6 is a diagram showing one example of a factor for compensating for an influence depending on a month in which data are acquired.

FIG. 6 is a diagram showing one example of a factor for compensating for an influence depending on a month in which data are acquired.

Referring to FIG. 6, the factor is 1.0 for January and December, is smaller than 1 from April to June, October and November, and is greater than 1 from July to September in summer. By dividing A found at step S20 by this factor, an amount of power usage B [kWh] that has taken into consideration the influence depending on a month is calculated.

Referring to FIG. 5 again, household power usage C [kW] is calculated at step S40. Here, predicted value B of the amount of power usage for 8 hours is divided by an integration time (8 hours) for conversion to power. Then, at step S50, an inverter output is determined. How the output of the inverter should be selected to produce a significant investment effect is an issue. Here, predicted value C of the power usage, found at step S40, is selected as output C (kW) of the inverter to be installed in the customer's house. Decision made as such is simple, and an actually satisfactory investment effect can also be achieved, as will be described below.

At step S60, an actual amount of battery power usage is calculated. Here, amount of power B found at step S30 is multiplied by a factor of 0.79 to find an amount of power usage D [kWh], which is discharged from the battery in 8 hours. The factor of 0.79 corresponds to a value when inverter output=average power (amount of battery power usage/average amount of power) on the vertical axis of the map in FIG. 17 described later.

Then at step S70, a battery capacity E is calculated. Here, although the battery capacity differs depending on the type of battery used and the like, assuming that, for example, 70% of the battery capacity is used, battery capacity E allowing discharge of amount of power usage D is found from E=D/0.7.

Lastly, at step S80, the operation results "inverter output C [kW], battery capacity E [kWh]" are displayed on display unit 110, to present the specifications of the power storage system to the customer, thus ending at step S90 the processing in this flowchart.

[Determination of Inverter Output]

The reason why inverter power=average household power usage at step S50 provides a significant advantage to the user will now be described. First, in order to determine the inverter power, a certain indication is needed, which is desirably easy and not very complicated.

Here, it is assumed that an investment effect is calculated according to the following equation (1):

investment effect=(power costs that can be saved when the battery has been used to the end of its life)/(initial investment)     (1).

Then, an inverter output and a battery capacity at which the investment effect is maximized are found.

Here, the following relations are established.

Power costs that can be saved when the battery has been used to the end of its life(lifelong cost advantage)=(power costs that can be saved in one year)×(battery life[year])     (2)

Electricity costs that can be saved in one year=(the smaller one of(an integrated value[kWh] of amounts of power usage not exceeding the inverter output), and(battery capacity[kWh]× ΔSOC))×(unit price of power in the daytime−unit price of power at night)     (3)

where ΔSOC represents the value set to 70% at step S70 in FIG. 5, although the value may differ depending on the type of battery.

Initial investment=inverter output[kW]×20,000 yen/ kW+battery capacity [kWh]×30,000 yen/kW A+50,000 yen     (4)

where 20,000 yen represent a unit price per inverter kilowatt, 30,000 yen represent a unit price per battery capacity kilowatt-hour, and 50,000 yen represent basic costs for, for example, a casing for housing the power storage system. It is noted that since the integrated value (kWh) of amounts of power usage not exceeding the inverter output differs for each household, it is found from results obtained in advance by acquiring data for one year of power usage from 9 to 17 o'clock for 5 monitored households.

Figure 7:
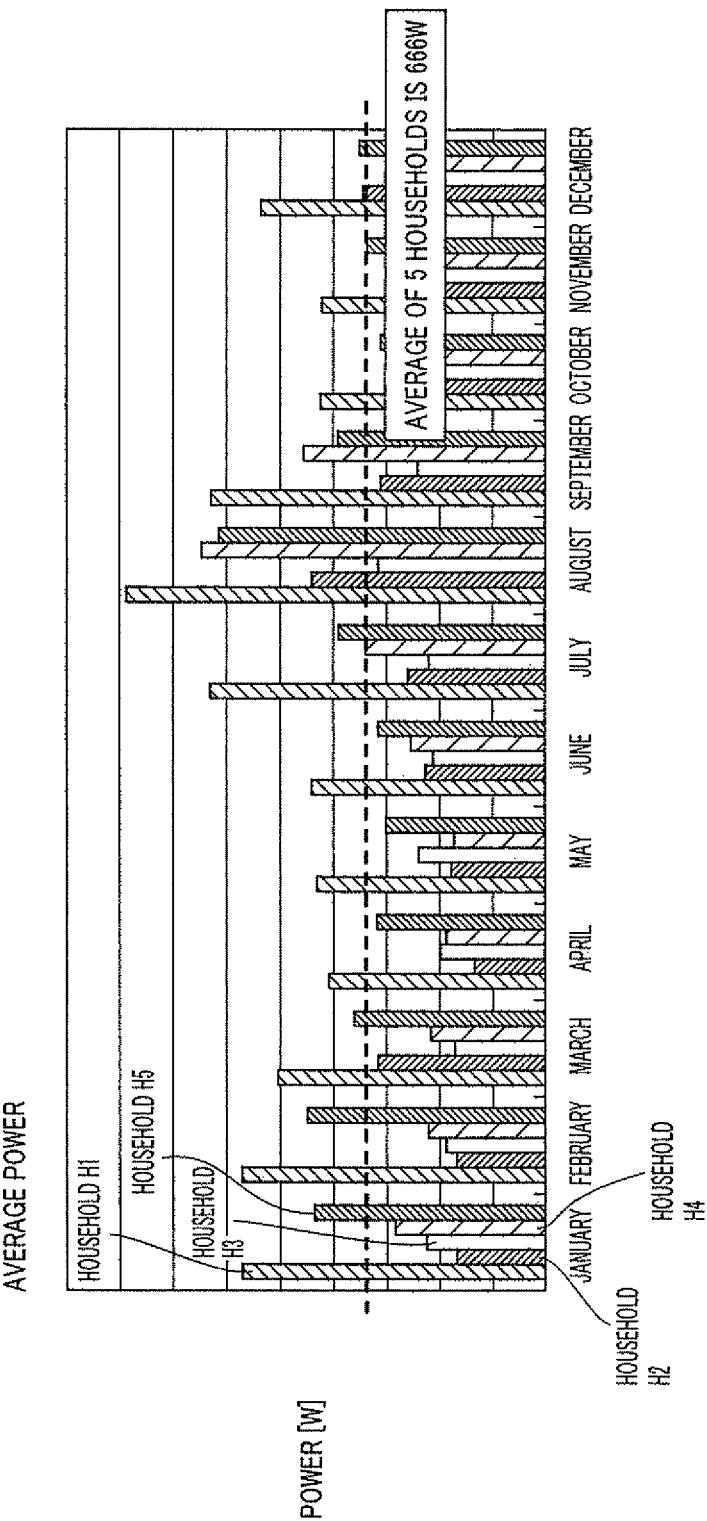
FIG. 7 is a diagram showing transition in average power usage in each month for 5 monitored households.

FIG. 7 is a diagram showing transition in average power usage in each month for 5 monitored households.

In FIG. 7, the horizontal axis represents month, and the vertical axis represents power. Average power usage of each of the 5 monitored households H1 to H5 is shown for each month. Here, average power usage of the five households was 666 W.

Figure 8:
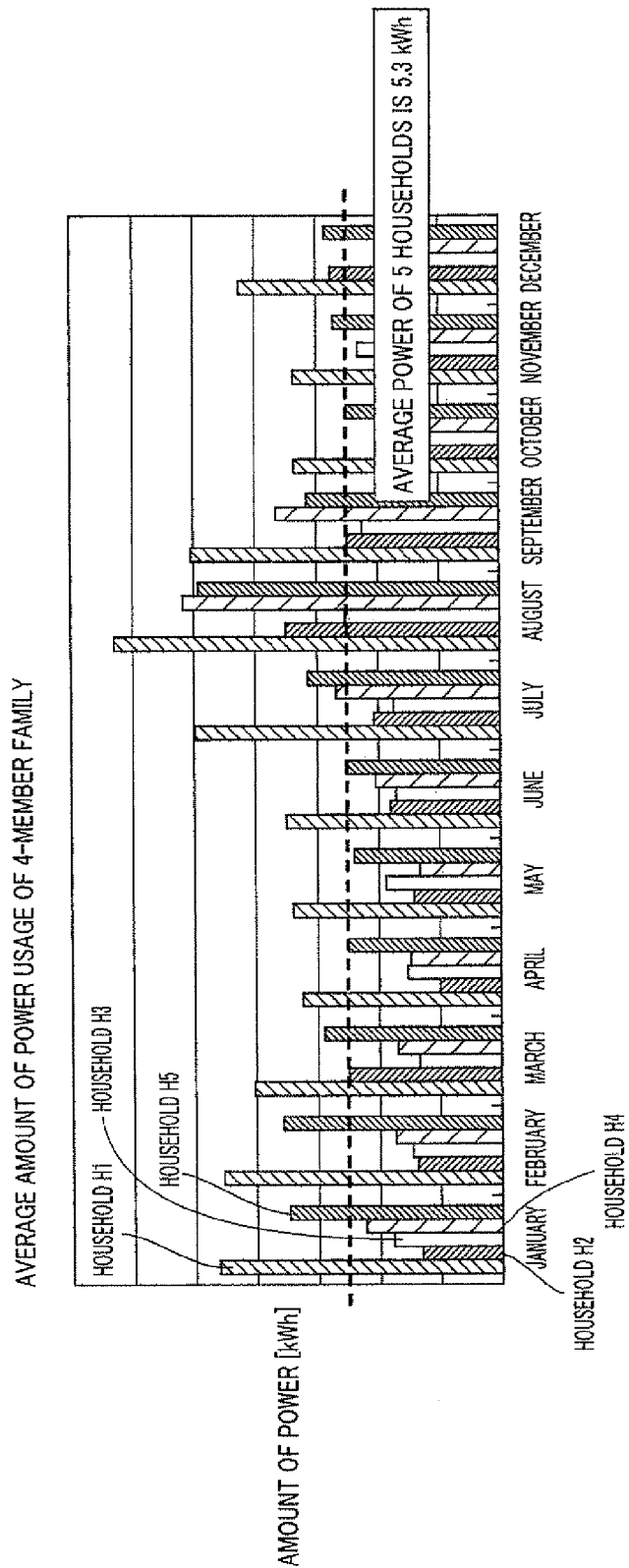
FIG. 8 is a diagram showing transition in an average amount of power usage in each month for 5 monitored households.

FIG. 8 is a diagram showing transition in the average amount of power usage in each month for 5 monitored households.

In FIG. 8, the horizontal axis represents month, and the vertical axis represents the amount of power. An average amount of power usage of each of the 5 households H1 to H5 is shown for each month. Here, average power usage of the five households was 5.3 kW.

Using the data of the monitored households shown in FIGS. 7 and 8, how the inverter output should be selected was considered.

Figure 9:
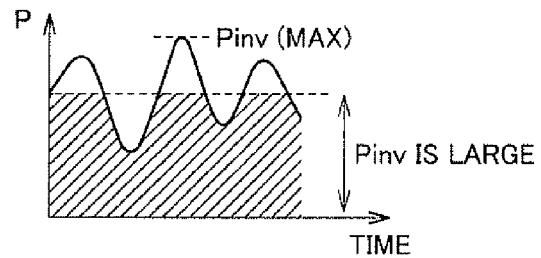
FIG. 9 is a diagram for explaining a battery capacity where the inverter output is set to be relatively large.

FIG. 9 is a diagram for explaining a battery capacity where the inverter output is set to be relatively large.

Figure 10:
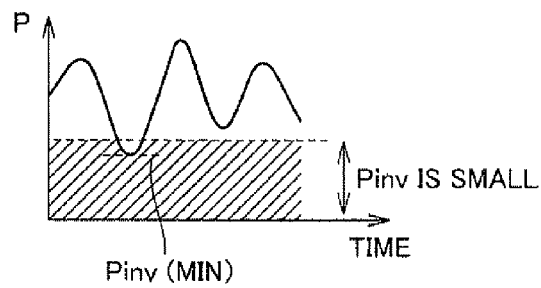
FIG. 10 is a diagram for explaining a battery capacity where the inverter output is set to be relatively small.

FIG. 10 is a diagram for explaining a battery capacity where the inverter output is set to be relatively small.

Referring to FIGS. 9 and 10, when the inverter output is set to be large relative to household power usage, the hatched region (integrated value of amounts of power usage not exceeding the inverter output) is wide, and when the inverter output is set to be small relative to household power usage, the hatched region is narrow. Each of the hatched regions is a portion in which power is supplied from the battery, and corresponds to P2 in FIG. 2. This portion is the portion in which expensive daytime power has been replaced with inexpensive nighttime power.

Even if inverter output Pinv is set to be greater than a maximum value Pinv (MAX) of household power usage, the hatched portion will not increase and the cost will only increase, which is meaningless. On the other hand, the output of the inverter may advantageously be increased in a region below minimum value Pinv (MIN) of household power usage, to thereby efficiently expand the hatched portion. Thus, the inverter output may preferably be set at an appropriate position intermediate between Pinv (MAX) and Pinv (MIN).

Here, the battery life in equation (2) is preferably longer. Battery life can be found from the number of battery life cycles. The number of battery life cycles is associated with a rate of current of the battery.

Prolonging battery life is briefly explained. Increasing the battery capacity increases the number of cells of the battery. Increase in the number of cells of the battery reduces a current to be carried by a single cell, thus prolonging the battery life. Increasing the battery capacity, however, increases the initial investment. Moreover, increasing the inverter output relative to the battery capacity increases a current per cell.

Figure 11:
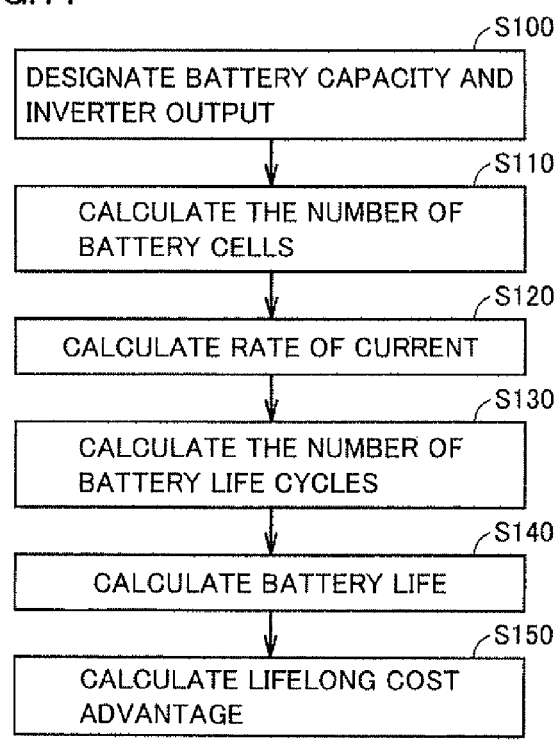
FIG. 11 is a flowchart for explaining a method of calculating a lifelong cost advantage to be achieved by the power storage system, in consideration of battery life.

FIG. 11 is a flowchart for explaining a method of calculating a lifelong cost advantage to be achieved by the power storage system, in consideration of battery life.

Referring to FIG. 11, first at step S100, a battery capacity and an inverter output are designated. Then, at step S110, the number of battery cells is calculated. The number of battery cells can be found according to equation (5) shown below. The rated power capacity herein corresponds to a capacity per battery cell. In addition, 0.7 is the value of ΔSOC also used at step S70 in FIG. 5.

The number of battery cells[pieces]=battery capacity [Wh]×0.7/rated power capacity[Wh]    (5)

Next, at step S120, a rate of current is calculated according to equation (6) shown below. The rate of current is a ratio of current with respect to rated power per battery cell.

Rate of current[CA]=inverter output[W]/the number of battery cells/rated power capacity[Wh]    (6)

Further, at step S130, the number of battery life cycles is calculated.

FIG. 12 is a diagram showing a relation between the number of battery life cycles and the rate of current.

As shown in FIG. 12, when the rate of current is determined, the number of battery life cycles is also determined. As the rate of current decreases, the number of battery life cycles increases. Increase in the number of battery life cycles also prolongs battery life.

At step S130, the number of battery life cycles is calculated with reference to a map in which the relation shown in FIG. 12 has been recorded. Then at step S140, a battery life is calculated. Assuming that charge/discharge is performed once a day, the battery life can be found according to the following equation (7):

battery life[year]=the number of battery life cycles [times]/365 [days]    (7).

Lastly at step S150, the lifelong cost advantage is calculated according to the following equation (8):

lifelong cost advantage[yen]=annual cost advantage [yen]×battery life [year]    (8).

The lifelong cost advantage found here is the lifelong cost advantage in equation (2).

FIG. 13 is a diagram showing results obtained by trial calculation of relations between initial investment and lifelong cost advantage.

In FIG. 13, the horizontal axis represents initial investment, and the vertical axis represents lifelong cost advantage. Results of trial calculation obtained by varying inverter output Pinv to 0.3, 0.6, 1.0, 2.0, 5.4 (kW) are shown. The initial investment increases when the battery capacity is increased. If the battery capacity exceeds the amount of household power usage, however, the lifelong cost advantage will not increase. Therefore, the investment effect is maximized at a point having a maximum inclination where a lifelong cost advantage Y is obtained with respect to an initial investment X in FIG. 13.

FIG. 14 is a diagram showing results obtained by finding an inverter output at which the investment effect is maximized for each monitored household.

Results in the lower column shown in FIG. 14 were obtained by creating a figure as shown in FIG. 13 for each of monitored households H1 to H5, and then finding an optimum inverter output. Results in the upper column were obtained by finding an average value throughout the year for each household from the data shown in FIG. 7. It is observed from these results that the inverter output at which the investment effect is maximized is substantially the same as the average power usage. Therefore, when average power usage is set as an inverter output also for a customer's house in which the power storage system is to be newly installed, a significant cost advantage may be achieved. Hence, the average power usage is used as the inverter output at step S50 in FIG. 5.

[Determination of Battery Capacity]

Figure 15:
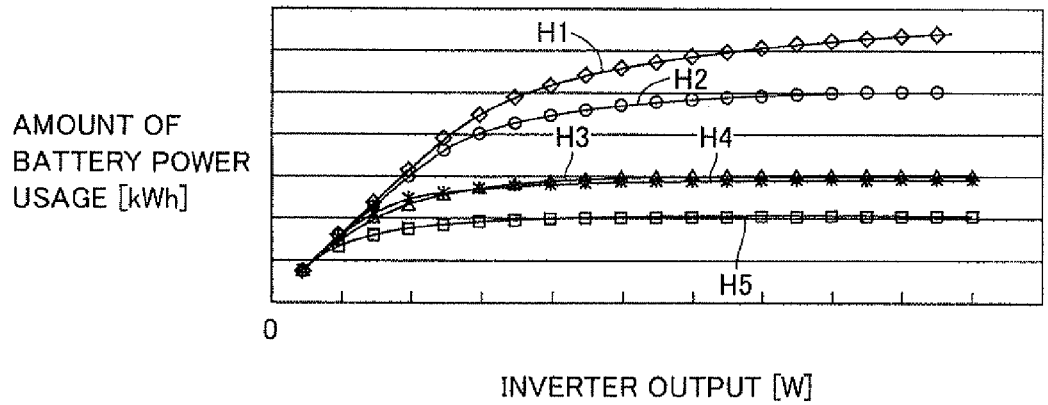
FIG. 15 is a diagram showing changes in an amount of battery power usage when the inverter output of a monitored household is varied.

FIG. 15 is a diagram showing changes in the amount of battery power usage when the inverter output of a monitored household is varied.

FIG. 15 shows, using the data used when calculating the average power usage of each of households H1 to H5 shown in FIG. 7, how the amount of battery power usage corresponding to the hatched portion changes by changing inverter output Pinv as described with reference to each of FIGS. 9 and 10. For each household, the amount of battery power usage changes linearly at low inverter outputs, whereas it levels off at high inverter outputs. This can also be understood from the fact shown in FIG. 9 that even though the inverter output is increased beyond Pinv (MAX), the hatched portion does not increase.

In FIG. 15, there is a considerable gap between household H1 with high power consumption and household H5 with low power consumption. Since how power is consumed thus differs variously, measures need to be taken when determining a battery capacity for each household.

Figure 16:
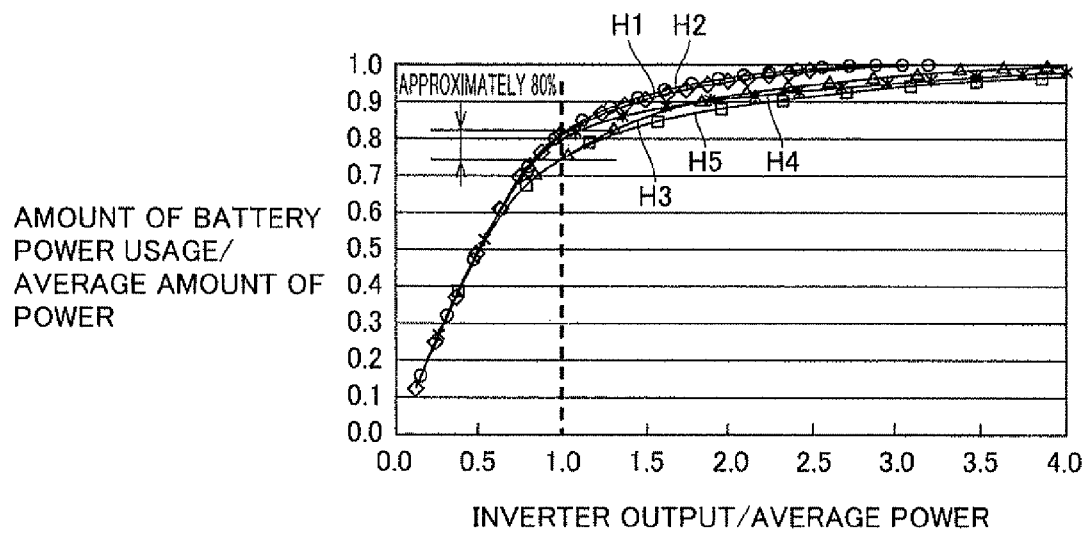
FIG. 16 is a diagram re-plotted by normalizing the inverter output in FIG. 15 based on the average power for each household, and then by normalizing the amount of battery power usage based on the average amount of power for each household.

FIG. 16 is a diagram re-plotted by normalizing the inverter output in FIG. 15 based on the average power for each household, and then by normalizing the amount of battery power usage based on the average amount of power for each household.

As shown in FIG. 16, it is observed that the 5 monitored households show substantially the same tendency after the normalization. It is also observed that by selecting the average power (corresponding to 1.0 on the horizontal axis) as the inverter output, approximately 80% of daytime power can be covered by power stored at midnight.

FIG. 17 is a map created based on FIG. 16.

The map in FIG. 17 is the map used for calculating the factor of 0.79 used at step S60 in FIG. 5. Even if the average power usage is not used as the inverter output at step S50, the inverter output/the average power may be calculated and the result be inputted to the map in FIG. 17 to thereby find a corresponding amount of battery power usage. Steps S60 to S80 may subsequently be performed, and then an appropriate inverter output and an appropriate battery capacity can be offered to the customer.

Lastly, the present embodiment is summarized with reference to the drawings. Referring to FIGS. 1 and 4, the power storage system according to the present embodiment includes power control unit 20 including an inverter configured to receive commercial AC power and convert the AC power to DC power, and battery 30 for storing electrical energy supplied with the commercial AC power by way of the inverter to supply the electrical energy to the electrical load. Apparatus 100 for selecting specifications of a power storage system includes data input interface unit 118 for input of data obtained by measuring power usage during prescribed hours at a location of power consumption where the power storage system is to be installed, and operation processing unit 114 for finding annual average power usage during the prescribed hours based on the measured data, and determining an output of the inverter based on the average power usage.

Preferably, operation processing unit 114 adopts the average power usage as the output of the inverter, as described at step S50 in FIG. 5.

More preferably, apparatus 100 for selecting specifications of a power storage system further includes a storage unit (database 116) for holding predetermined compensation factors corresponding to a plurality of inverter outputs, respectively. Operation processing unit 114 acquires from the storage unit a compensation factor corresponding to a selected output of the inverter, and calculates an actual amount of use out of the power usage available from the power storage device by multiplying, by the acquired compensation factor, an amount of power used in one day during the prescribed hours obtained based on a result of measuring the power usage (step S60), and determines a capacity of the power storage device based on the actual amount of use (step S70).

Even more preferably, the apparatus for selecting specifications of a power storage system further includes display unit 110 for displaying the determined output of the inverter and the determined capacity of the power storage device.

The apparatus for selecting specifications of a power storage system according to the present embodiment is capable of offering a power storage system suitable for power usage patterns of a customer household.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10: commercial power supply, 20: power control unit, 30: battery, 40: household load, 50: watt-hour meter, 100: apparatus for selecting specifications, 110: display unit, 112: input unit, 114: operation processing unit, 116: database, 118: data input interface unit, 120: recording medium.

The invention claimed is:

1. An apparatus for selecting specifications of a power storage system,
the power storage system including
an inverter configured to receive commercial AC power and convert the AC power to DC power, and
a power storage device for storing electrical energy supplied with the commercial AC power by way of the inverter to supply the electrical energy to an electrical load, the apparatus comprising:
an interface for input of data obtained by measuring power usage during prescribed hours at a location of power consumption where the power storage system is to be installed; and
an operation processing unit for finding annual average power usage during the prescribed hours based on data that is obtained by compensating the measured data with a variation factor, the variation factor is for compensating for an influence depending on a month in which the measured data are acquired, the variation factor is found by monitoring power usage during the prescribed hours at the location of power consumption for at least one year, and determining an output of the inverter based on the average power usage, wherein
the operation processing unit presents the average power usage as the output of the inverter.

2. The apparatus for selecting specifications of a power storage system according to claim 1, further comprising a storage unit for holding predetermined compensation factors, the predetermined compensation factors being values of a normalized amount of the power storage device power usage based on an average amount of power for the location of power consumption, corresponding to a plurality of inverter outputs, respectively, wherein
the operation processing unit acquires from the storage unit a predetermined compensation factor corresponding to a selected output of the inverter, and calculates an actual amount of use out of the power usage available from the power storage device by multiplying, by the acquired predetermined compensation factor, an amount of power used in one day during the prescribed hours obtained based on a result of measuring the power usage, and determines a capacity of the power storage device based on the actual amount of use.

3. The apparatus for selecting specifications of a power storage system according to claim 2, further comprising a display unit for displaying the determined output of the inverter and the determined capacity of the power storage device.

4. A method for selecting specifications of a power storage system,
the power storage system including
an inverter configured to receive commercial AC power and convert the AC power to DC power, and
a power storage device for storing electrical energy supplied with the commercial AC power by way of the inverter to supply the electrical energy to an electrical load, the method comprising the steps of:
measuring power usage during prescribed hours at a location of power consumption where the power storage system is to be installed;
finding annual average power usage during the prescribed hours based on a result of measurement that is obtained by compensating the measured data with a variation factor, the variation factor is for compensating for an influence depending on a month in which the measured data are acquired, the variation factor is found by monitoring power usage during the prescribed hours at the location of power consumption for at least one year; and determining an output of the inverter based on the average power usage, wherein in the step of determining an output of the inverter, the average power usage is presented as the output of the inverter.

5. The method for selecting specifications of a power storage system according to claim 4, further comprising the steps of:

acquiring a predetermined compensation factor, the predetermined compensation factor being a value of a normalized amount of the power storage device power usage based on an average amount of power for the location of power consumption, corresponding to a selected output of the inverter from a predetermined map; and calculating an actual amount of use out of the power usage available from the power storage device by multiplying, by the acquired predetermined compensation factor, an amount of power used in one day during the prescribed hours obtained based on a result of measuring the power usage, and determining a capacity of the power storage device based on the actual amount of use.

* * * * *